Aug. 28, 1923.

F. L. LIPCOT ET AL 1,466,452

AIR BRAKE FOR MOTOR PROPELLED RAIL CARS

Filed March 17, 1922

Patented Aug. 28, 1923.

1,466,452

UNITED STATES PATENT OFFICE.

FRED L. LIPCOT, CHARLES F. DRUMM, JR., AND MAXIMILIAN C. FRINS, OF NEW YORK, N. Y., ASSIGNORS TO INTERNATIONAL MOTOR COMPANY, OF NEW YORK, N. Y., A CORPORATION OF DELAWARE.

AIR BRAKE FOR MOTOR-PROPELLED RAIL CARS.

Application filed March 17, 1922. Serial No. 544,615.

*To all whom it may concern:*

Be it known that we, FRED L. LIPCOT, CHARLES F. DRUMM, Jr., and MAXIMILIAN C. FRINS, citizens of the United States, residing, respectively, in the borough of Manhattan, in the borough of Queens, and in the borough of Manhattan of the city of New York, in the State of New York, have invented certain new and useful Improvements in Air Brakes for Motor-Propelled Rail Cars, of which the following is a specification, reference being had to the accompanying drawing, forming a part hereof.

This invention relates to air brakes for rail cars which are propelled by an engine and will find its most important application to the traction wheels of such cars. The principal object of the invention is to provide an adaptation of air brakes to such uses which shall be simple in construction, readily applicable to the standard parts of such a rail car, invariable in operation and effective in action to exert uniform unit pressures on the treads of the wheels at all loads, the proper relation of the shoes to the treads under different loads being substantially preserved within practical limits by the improved construction. More particularly, the invention relates to an air brake construction in which the braking power shall be applied through simple rigging and one which shall transmit the braking forces to the shoes at opposite sides of the vehicle uniformly and without torsional stresses in the rigging. Still another object of the invention is to mount the brake shoes from the frame of the vehicle and connect them operatively to the brake cylinders by devices which shall maintain the shoes concentric with the curved treads when the frame moves up and down under varying loads and conditions of use.

In the accompanying drawing the invention has been shown as embodied in a suitable brake rigging for application to the rear drive wheels of a motor propelled rail car of essentially conventional automotive construction.

Figure 1:
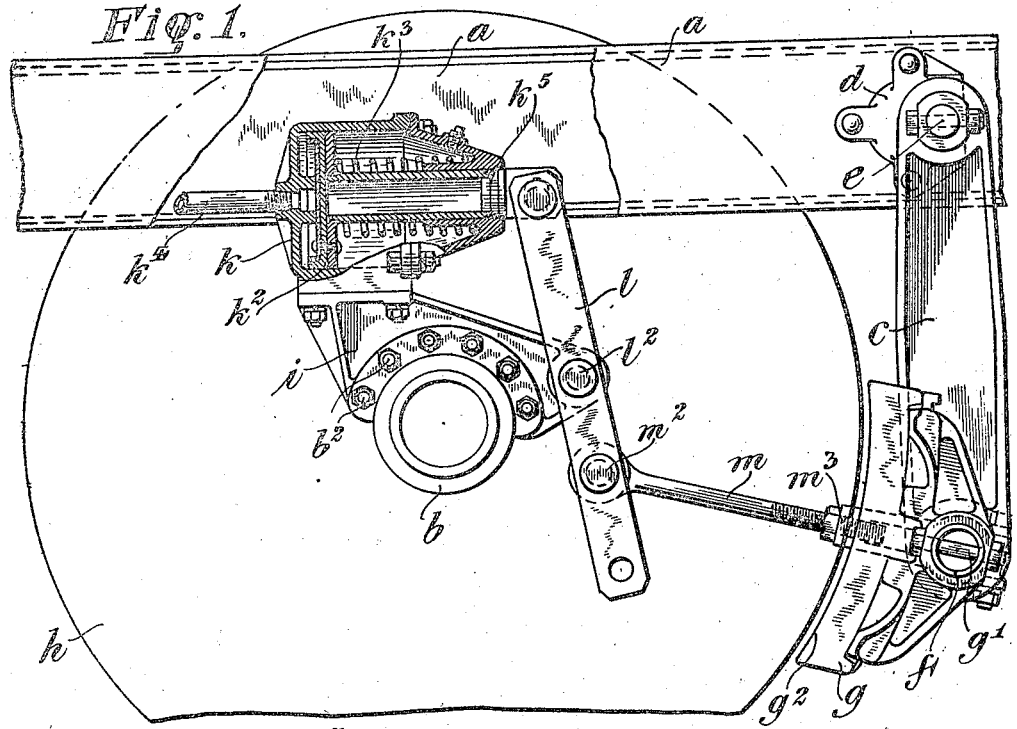
Figure 1 is a view partly in elevation and partly in vertical section showing so much of the improved air brake as is necessary for an understanding of the operation thereby of one brake shoe on one wheel.
Figure 2:
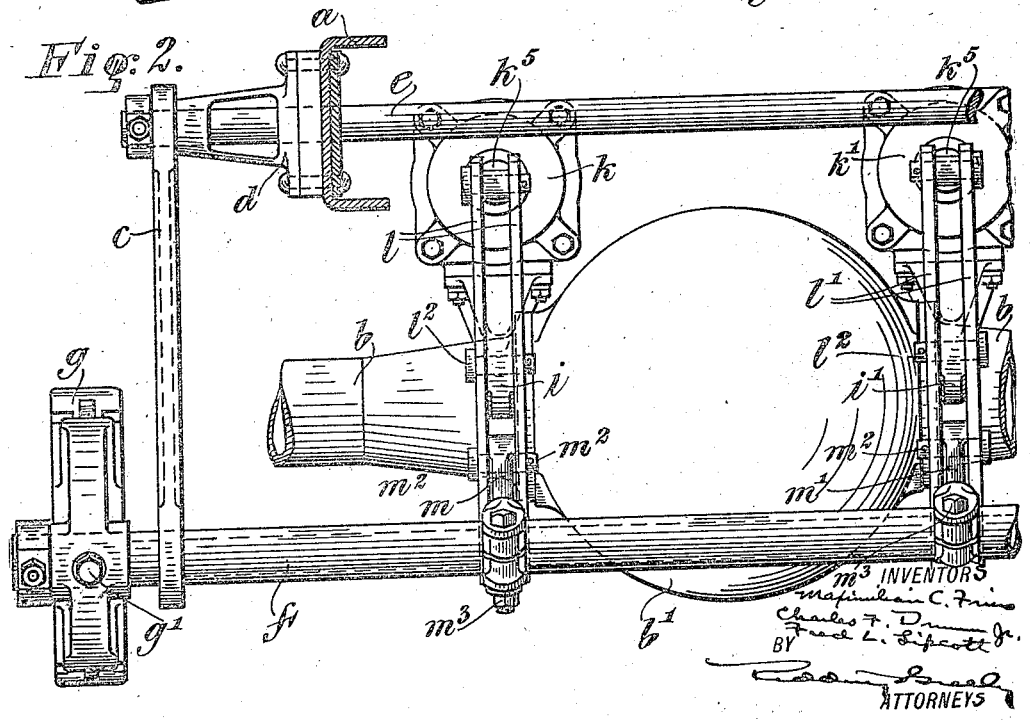
Figure 2 is a view in rear elevation showing part of the rear axle housing of a rail car and the application thereto of two brake cylinders and the transverse brake beam operated thereby.

The chassis frame members $a$ are supported on the rear axle housing $b$ in accordance with accepted practice and will move up and down relatively thereto under varying loads and conditions of operation. From the side frame members $a$ of the chassis are supported swinging links $c$ as from brackets $d$ secured to the side frame members and in which may be journaled a supporting rod $e$ or the like for attachment of the links. It will be understood that while the links $c$ may be otherwise pivotally supported on the chassis, the single through rod $e$ extending from side to side between the frame members $a$ may lend some additional rigidity to the frame and facilitate assembling. In the lower ends of the links is pivotally supported a transverse brake beam $f$ which may conveniently be of circular and, perhaps, tubular form. Adjacent to the outer ends of the brake beam $f$ are secured fixedly brake shoes $g$ in operative relation to the traction wheels $h$ at opposite sides of the car. A bolt $g'$ may be employed to secure the shoe $g$ rigidly to the brake beam $f$. The curved face $g^2$ of each brake shoe will, of course, be formed concentric with the tread of the wheels $h$.

The means for applying the brakes $g$ will now be described. On the dead axle housing $b$ may be secured supporting brackets $i$, $i'$, preferably at opposite sides of the mid section. It is frequently the practice to bolt axle tubes $b$ to a central housing $b'$ for the final drive gear and when this is done it is found feasible to employ the same bolts $b^2$ to secure the respective brackets $i$, $i'$, to the dead axle housing. For convenience, the under-side of the brackets will be curved to conform to the curvature of the housing on which they rest. On the brackets $i$, $i'$, are supported air brake cylinders $k$, $k'$, respectively, which are of similar internal construction including a piston $k^2$ which moves against the action of the spring $k^3$ under the influence of air admitted at one end through the supply pipe $k^4$. The stem $k^5$ of the piston extends through the opposite end of the cylinder and is operatively connected to the brake beam $f$. Various link connections may be employed, but that shown in the drawings has been found to be satisfactory in practice. On each of the brackets $i$, $i'$, is pivotally supported an operating lever $l$, $l'$, respectively, as by pivot pins $l^2$. One end of each operating lever is pivotally connected to the steam $k^5$ of the pistons $k^2$ within the cylinders $k$, $k'$, respectively. The levers $l$, $l'$, are connected at the other side of their pivot pins $l^2$ through adjustable rods $m$, $m'$, respectively, with the brake beam $f$. The rods $m$, $m'$, may be pivotally connected to the respective levers by pins $m^2$. A turn buckle adjustment, indicated generally at $m^3$ in each rod, permits the adjustment of the length. The free ends of the rods are secured fixedly to the brake beam $f$ by means of bolts $m^3$ passing through their split ends.

From the description given it will be evident that upon the admission of air at the same pressure to each of the cylinders $k$, $k'$, the levers $l$, $l'$, will be rocked about their pivots $l^2$ thereby transmitting the braking effort through the rods $m$, $m'$, to the brake beam $f$, uniformly, and at equal distances from the mid point thereof. Accordingly, the braking pressures on each of the shoes $g$ will be equal and uniform per unit pressure throughout their faces.

An important feature of the invention is found in the inclusion in the rigging of means for maintaining the curved faces $g^2$ of the brake shoes concentric with the treads of the wheels under all loads and varying conditions of operation. This is accomplished in the illustrated embodiment by adjusting the shoes $g$ to proper relation to the treads of the wheels, under the mean load of the car and then connecting the rods $m$, $m'$, between the brake beam $f$ and their respective levers $l$, $l'$, so that they will normally extend along the radius of the wheels. This condition is shown clearly in Figure 1. Theoretically, it would be desirable to not only have the pull rods $m$, $m'$, lie along the radius of the wheels but also have them equal in length to such radius. This is practically impossible, of course, since their length is limited at least by the radius of the axle housings $b$ and also by the necessary support, such as the brackets $i$, $i'$, for the levers $l$, $l'$. However, in accordance with the present invention it is proposed to have the rods of nearly the same length as the radius of the wheels $h$ and normally lie along the radius of said wheels so that when the frame $a$ moves up or down with respect to the axle and carries the brake shoes $g$ with it these shoes will move on an arc practically concentric with the center of the wheels. This movement is insured by rigidly connecting the ends of the rods $m$, $m'$, to the brake beam $f$ and pivotally connecting their inner ends as at $m^2$ to the levers $l$, $l'$. The brake beam $f$ is pivotally suspended in the links $c$ so, of course, moves up and down bodily with these links under varying loads but is free to turn in the links to conform to movements of the brake shoes $g$ about the pins $m^2$.

The construction described insures the application of equal pressures to the brake beam at opposite sides of its mid point and the application of equal pressures to the brake shoes by devices which are simple and easy to apply to the conventional parts of an automotive rail car.

The invention consists in the combination of parts recited in the appended claims.

What we claim is:

1. In a rail car in combination with the chassis and a supporting wheel therefor a curved brake shoe mounted pivotally on said chassis and in operative concentric relation to the tread of said wheel, an axle on which the wheel is journaled and brake operating means carried with the axle and including an operating rod having one end movable with the axle and the other end movable with the chassis, the last named end being fixed with relation to the brake shoe and said rod being normally disposed on a radius of the wheel and substantially of the same length as the radius.

2. In a rail car in combination with the chassis and traction wheels brake shoes mounted in operative relation thereto and concentric therewith, respectively, a brake beam on which the shoes are carried, a dead axle on which the wheels are journaled, air brake cylinders and operative connections between the cylinders and the brake beam including operating levers and rods connected rigidly at one end to the brake beam and at the other end pivotally to the levers, respectively, said rods normally lying along a radius of the wheels and being of nearly the same length as said radius.

3. In a brake system for rail cars propelled by an internal combustion engine, and having rear axle tubes on which the wheels are journaled, brackets bolted to said tubes at equal distances from the mid section of the dead axle, air brake cylinders, operating levers pivoted on the brackets and pivotally connected to the respective pistons, brake shoes pivotally hung from the chassis and operative connections between said levers and said brake shoes.

4. In an automative rail car in combination with the chassis and dead axle, links pivotally hung from opposite side members of the chassis a circular brake beam pivotally supported in said links and extending transversely of said chassis brake shoes secured fixedly to said brake beam in line with the respective wheels, and an operating rod adjustably but fixedly secured to said brake beam, said rod normally lying along a radius of the wheels and of a length nearly equal to the radius thereof.

5. In an automotive rail car in combination with the side frame members of the chassis and the dead axle, a rod extending transversely between the side frame members, brackets carried by the side frame members and in which said rod is journaled links hung pivotally from the opposite ends of said rod a brake beam supported pivotally in the lower ends of said links and extending transversely of the car, brake shoes secured to the brake beam at points outside of said links operating rods secured to the brake beam at points inside of said links and at equal distances on opposite sides of the mid point of the brake beam, air cylinders mounted on the axle at equal distances on opposite sides of the mid point of the axle and means to connect said cylinders operatively with said operating rods.

This specification signed this 14 day of March A. D. 1922.

FRED L. LIPCOT.
CHARLES F. DRUMM, Jr.
MAXIMILIAN C. FRINS.